United States Patent
Gosper et al.

(10) Patent No.: US 7,912,875 B2
(45) Date of Patent: Mar. 22, 2011

(54) APPARATUS AND METHOD FOR FILTERING DATA USING NESTED PANELS

(75) Inventors: Julian Lars Gosper, Vancouver (CA); Adam Binnie, Bowen Island (CA); Davor Cubranic, Vancouver (CA); Richard Bruce Cameron, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 305 days.

(21) Appl. No.: 11/555,206

(22) Filed: Oct. 31, 2006

(65) Prior Publication Data

US 2008/0104051 A1 May 1, 2008

(51) Int. Cl.
*G06F 17/30* (2006.01)

(52) U.S. Cl. ...................................................... 707/805

(58) Field of Classification Search .................. 715/762; 707/1, 100, 102, 805, 999.102
See application file for complete search history.

(56) References Cited

U.S. PATENT DOCUMENTS

| | | | |
|---|---|---|---|
| 4,725,658 A | 2/1988 | Thayer et al. | |
| 6,101,493 A | 8/2000 | Marshall et al. | |
| 6,348,932 B1 * | 2/2002 | Nishikawa et al. | 715/719 |
| 6,912,527 B2 | 6/2005 | Shimano et al. | |
| 6,963,867 B2 | 11/2005 | Ford et al. | |
| 6,984,390 B2 | 1/2006 | Sakuta | |
| 7,461,051 B2 | 12/2008 | Lavine | |
| 7,689,666 B2 | 3/2010 | Commons | |
| 7,734,576 B2 * | 6/2010 | Simon et al. | 707/602 |
| 2001/0049677 A1 | 12/2001 | Talib et al. | |
| 2002/0038299 A1 | 3/2002 | Zernik | |
| 2005/0049992 A1 | 3/2005 | Gupta | |
| 2006/0053389 A1 | 3/2006 | Michelman | |
| 2006/0161867 A1 | 7/2006 | Drucker | |
| 2006/0218503 A1 | 9/2006 | Martthews | |
| 2007/0179967 A1 | 8/2007 | Zhang | |

FOREIGN PATENT DOCUMENTS

| | | |
|---|---|---|
| WO | WO 99/62006 | 12/1999 |
| WO | WO 02/44942 | 6/2002 |
| WO | WO 2006/0037613 | 4/2006 |

OTHER PUBLICATIONS

Business Objects S.A., EP 07863616. Supplementary European Search Report (Mar. 8, 2010).

Elliott, "Flamenco Image Browser: Using Metadata to Improve Image Search During Architectural Design", In CHI '01 Extended Abstracts on Human Factors in Computing Systems, 2 pgs., (Seattle, WA, Mar. 31-Apr. 5, 2001) (http://flamenco.berkeley.edu/papers/elliott-doctoral-consortium01.pdf).

Hearst, "Clustering Versus Faceted Categories for Information Exploration", Communications of the ACM, 49:(4):59-61 (2006) (http://flamenco.berkeley.edu/papers/cacm06.pdf).

(Continued)

*Primary Examiner* — Cheryl Lewis
(74) *Attorney, Agent, or Firm* — Cooley LLP (57) ABSTRACT

A computer implemented method includes receiving a data filter from a first panel of filtering categories. The data filter is applied to a dataset wherein a resulting data subset is created. One or more further data filters is displayed within a nested second panel of filtering categories.

20 Claims, 13 Drawing Sheets

OTHER PUBLICATIONS

Hearst, "Design Recommendations for Hierarchical Faceted Search Interfaces", ACM SIGIR Workshop on Faceted Search, SIGIR '06 Workshop on Faceted Search, Seattle, WA (Aug. 10, 2006) (http://flamenco.berkeley.edu/papers/faceted-workshop06.pdf).

Hearst et al., "Finding the Flow in Web Site Search", Communications of the ACM, 45(9):42-49 (2002) (http://flamenco.berkeley.edu/papers/cacm02.pdf).

Hearst, "Next Generation Web Search: Setting Our Sites", IEEE Data Engineering Bulletin, 23:38-48 (2000) (http://flamenco.berkeley.edu/papers/data-engineering.pdf).

Hostetter, "Faceted Searching with Apache Solr", Web Document created Oct. 13, 2006, accessed Aug. 10, 2009 (http://people.apache.org/~hossman/apachecon2006us/faceted-searching-with-solr.pdf).

Kules et al., "Designing a Metadata-driven Visual Information Browser for Federal Statistics", Proceedings of the 2003 Annual Nat'l Conf on Digital Government Research (Boston, MA, May 18-21, 2003). 130:1-6 (http://www.ils.unc.edu/govstat/papers/MetadataBrowser-20030305.pdf).

Oren et al., "A Prototype for Faceted Browsing of RDF Data", Proceedings of Scripting for the Semantic Web Workshop at the ESWC, Budva, Montenegro, Jun. 12, 2006 (http://sunsite.Informatik.rwth-aachen.de/Publications/CEUR-WS/Vol-161/challenge6.pdf).

Priss, 1998 "A Graphical Interface for Conceptually Navigating Faceted Thesauri", Proceedings of the Fifth Intern'l ISKO Conf., Lille, France (1998) (http://www.upriss.org.uk/papers/Isko98.pdf).

Ross et al., 2005. "A Faceted Query Engine Applied to Archaeology", Proceedings of the 31st Intern'l Conf. on Very Large Data Bases (Trondheim, Norway, Aug. 30-Sep. 2, 2005). pp. 1334-1337 (http://www.cs.columbia.edu/~kar/pubsk/vldb2005demo.pdf).

Schraefel et al., 2006 "mSpace: Improving Information Access to Multimedia Domains with Multimodal Exploratory Search", Commun. ACM, 49(4):47-49 (http://eprints.ecs.soton.ac.uk/12376/1/mspace,__Exploratory_Search,__Special_issuue,__Communications_of_the_ACM.pdf).

Seamark Naviagator, "From Site Search to the Semantic Web", Siderean Software, 5155 West Rosecrans Avenue, Suite 1078, Los Angeles, CA 90250, www.siderean.com (2003) (http://www.siderean.com/downloads/SemanticWebWhitePaper.pdf).

Stephensa et al., "Aggregation of Bioinformatics Data Using Semantic Web Technology", Web Semantics: Science, Services and Agents on the World Wide Web, 4(3):216-221 (2006) (http://citeseerx.ist.psu.edu/viewdoc/download?doi=10.1.1.108.5408&rep=rep1&type=pdf.

Stoica et al., "Demonstration: Using WordNet to Build Hierarchical Facet Categories" SIGIR'06 Workshop on Faceted Search, Aug. 10, 2006, Seattle, WA (http://flamenco.berkeley.edu/papers/stoica-faceted06.pdf).

Yee et al., 2003 "Faceted Metadata for Image Search and Browsing" SIGCHI Conf. on Human Factors in Computing Systems (Ft. Lauderdale, FL Apr. 5-10, 2003). pp. 401-408 (http://flamenco.berkeley.edu/papers/flamenco-chi03.pdf).

Yee et al., "Flamenco Software Release 1.0", Updated Apr. 23, 2006. Accessed Aug. 10, 2009 (http://flamenco.berkeley.edu/doc.html).

International Search Report and Written Opinion for International Application No. PCT/US/07/82870 mailed on Sep. 12, 2008, 8 pages.

Business Objects S,A., PCTUS2007/082871, Int'l Search Report/Written Opinion (Jul. 16, 2008).

Business Objects S.A. EP Appln. 07863617, Suppl. Partial EP Search Report (Jul. 27, 2010).

Greene et al., The end of zero-hit queries: query previews for NASA's Global Change Master Directory. Int. J. Digit Libr (1999) 2:79-90.

Yang, et al. A comparive study on feature selection in text categorization. Machine Learning. Proc. Int'l Conf. (Jul. 8, 1997).

Gile, "In search of the ubiquitous analytic end user: profiling the analytic end user" DM Review (Sep. 2003).

Ahlberg et al. "Visual information seeking: tight coupling of dynamic query filters with starfield displays", Proc. ACM Conference on Human Factors in Software, CHI '94, Boston, pp. 313-317 (Apr. 1994).

* cited by examiner

APPARATUS AND METHOD FOR FILTERING DATA USING NESTED PANELS

CROSS REFERENCE TO RELATED APPLICATIONS

This application is related to the following concurrently filed, commonly owned U.S. patent application, which is incorporated by reference herein: "Apparatus and Method for Categorical Filtering of Data', U.S. Pat. No. 7,493,330, filed Oct. 31, 2006.

BRIEF DESCRIPTION OF THE INVENTION

This invention relates generally to data filtering. More particularly, this invention relates to the use of nested panels to display multiple layers of data filters.

BACKGROUND OF THE INVENTION

Filtering large datasets is a cumbersome task as there are often many categories for filtering. The prior art has approached this problem through menu systems. However, this is problematic as it is difficult to track what path has been taken to reach a current subset of data. Additionally, it is difficult to make changes to previous filtering selections without restarting from the original dataset.

Thus, it would be advantageous to provide a system that enables the effective display of a filter path as well as the update of previously specified filters.

SUMMARY OF THE INVENTION

The invention includes a computer implemented method of receiving a data filter from a first panel of filtering categories. The data filter is applied to a dataset wherein a resulting data subset is created. One or more further data filters is displayed within a nested second panel of filtering categories.

The invention also includes a computer readable storage medium with executable instructions to present a first panel of filtering categories. A selection of a first set of one or more data filters is received from the first panel. The first set of one or more data filters is applied to a dataset. A second set of one or more available data filters is displayed within a nested second panel of filtering categories.

The invention also includes a method of displaying data filter panels within a window of a graphical user interface on a computer. A first data filter panel is displayed, wherein the first data filter panel includes a data filter from a first plurality of data filters. A data filter is received from the first plurality of data filters. The data filter is applied to a dataset to create a data subset. A view of the data subset is displayed. A second data filter panel is also displayed. The second data filter panel is adjacent to the first data filter panel and the second data filter panel includes a second plurality of data filters that are available to filter the data subset.

BRIEF DESCRIPTION OF THE FIGURES

The invention is more fully appreciated in connection with the following detailed description taken in conjunction with the accompanying drawings, in which:

FIG. 5 illustrates the display of results in a record list format in accordance with an embodiment of the invention.

Like reference numerals refer to corresponding parts throughout the several views of the drawings.

DETAILED DESCRIPTION OF THE INVENTION

The following terminology is used while disclosing embodiments of the invention:

An attribute is any non-null value in a dataset.

A chart is a collection of visual elements used to convey information (e.g., a pie chart, a bar graph, a scatter plot, a line graph). A chart is a visualization.

A data breakdown category is a filtering category specified as a basis for a data display in a chart view. The chart view reflects distribution of data over attributes of a filtering category.

A data filter or filter is a criterion or a set of criteria that divides a dataset into two subsets, a subset of data that meets the criterion or set of criteria and a subset of data that does not. For example, a data filter is one or more attributes belonging to the same filtering category.

A data filter panel or filter panel is a distinct section of the Graphical User Interface that displays a group of one or more filtering categories.

A filtering category is a group of one or more filters (e.g., a group of correlated attributes which can be used to select subsets of related data).

A head panel is an initially displayed filler panel.

A measure is a quantity as ascertained by comparison with a standard, usually denoted in some unit, e.g., units sold, dollars. A measure, such as revenue, can be displayed for a dimension, e.g., "Year". Corresponding measures can also be displayed for each value within a dimension.

A nested panel or nested filter panel is a filter panel that is displayed adjacent to its parent filter panel.

A record set is a collection of values that comprise a logical entry in a data source, e.g., a row from a relational database table.

A table maps the logical structure of a set of data into a series of columns or rows. Thus, a table is a visualization. To facilitate representation in two dimensions, higher-dimensional tables of data are often represented in an exploded view comprising a plurality of two dimensional tables. A table can be rectangular, triangular, octagonal and the like. A table can have row and column headings, where each cell in a table can show the value associated with the specific combination of row and column headings. Some tables can hold charts or record sets in their cells; this is a spatially economic way to display many charts with common axes. A table is to be conceptually differentiated from a record set.

A visualization is a graphic display of quantitative information. Types of visualizations include charts, tables and record sets.

Figure 1:
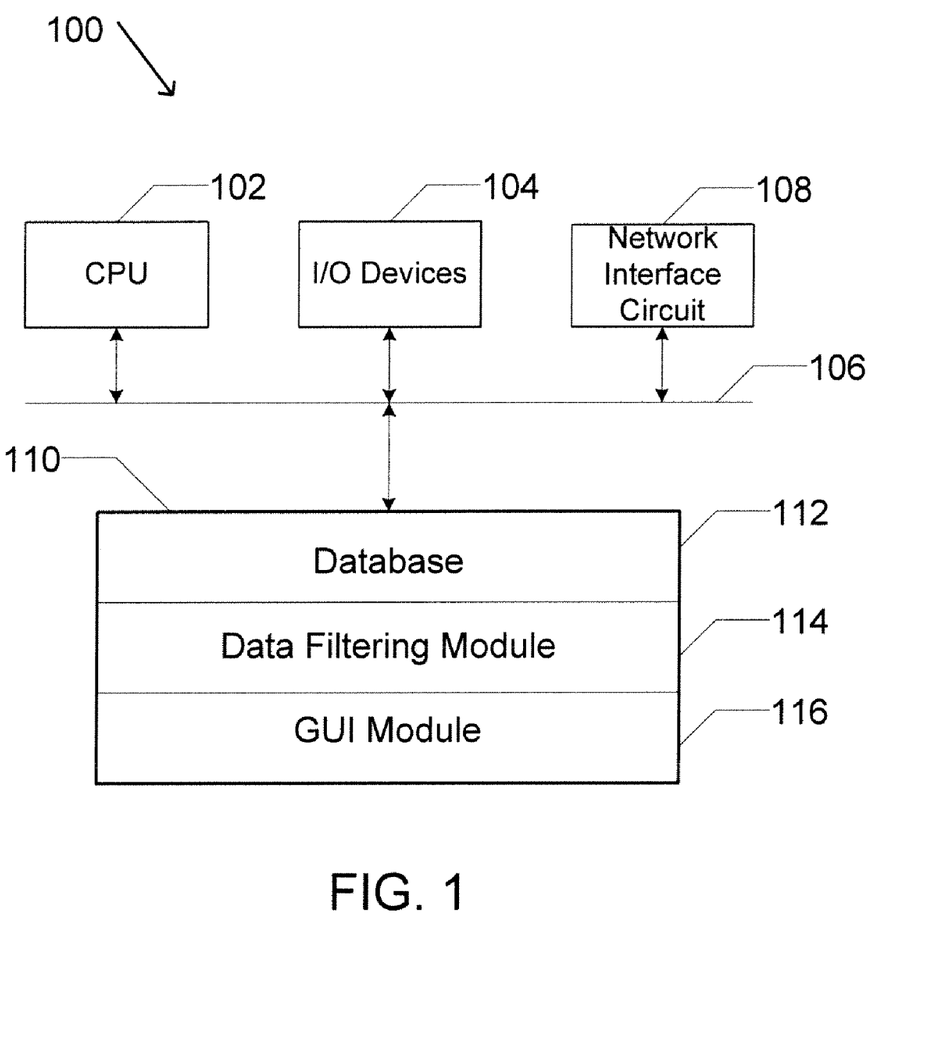
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit 108 provides connectivity to a network (not shown), thereby allowing the computer 100 to operate in a networked environment.

A memory 110 is also connected to the bus 106. The memory 110 stores executable instructions to implement operations of the invention. In one embodiment, the executable instructions include a data filtering module 114. The data filtering module 114 includes executable instructions to extract data filtering categories from a data source (e.g., a database 112, a data warehouse, an XML file), accept data filter selections from the user or a default setting, return the appropriate data subset and determine the subsequent set of data filtering categories.

Memory 110 also stores a Graphical User Interface (GUI) module 116. The GUI module 116 displays the data filtering categories in a nested panel format as well as the returned data subsets. The nested panels may be displayed horizontally progressing from left to right or from right to left, or vertically, progressing from top to bottom or bottom to top. In one embodiment, the filtered data results are displayed in a chart format (e.g., a pie chart, a bar graph) and a record list format.

While the various components of memory 110 are shown residing in the single computer 100, it should be recognized that such a configuration is not required in all applications. For instance, the data source may reside in a separate computer (not shown in FIG. 1) that is connected to a network through the network interface circuit 108. Similarly, the data filtering module 114 may reside in another computer (not shown in FIG. 1), separate from both the computer 100 and the computer storing the data source, which is also connected to a network. Additionally, the executable instructions stored in memory 110 need not be in separate modules. The invention is directed toward the operations disclosed herein. There are any number of ways and locations to implement those operations, all of which should be considered within the scope of the invention.

Figure 2:
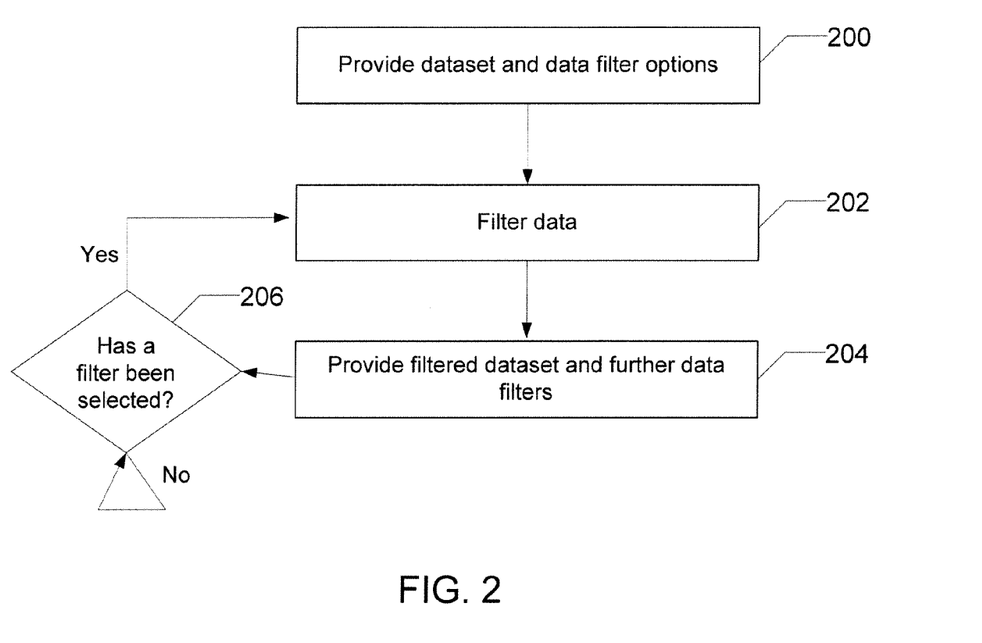
FIG. 2 illustrates processing operations associated with an embodiment of the invention.

FIG. 2 illustrates processing operations that may be implemented by the computer 100. The first processing operation 200 of FIG. 2 is to provide a dataset and data filter options to a user. The data filtering module 114 retrieves the filtering categories for the specified dataset and all distinct attributes for each filtering category. In one embodiment, the order of the filtering categories and the order of the associated attributes are determined by the data filtering module 114. In another embodiment, the orders are specified by the user.

In one embodiment, filtering categories are selected based on one or more criteria such that the filtering categories resolve the dataset into subsets. The criteria can be drawn from statistics, information theory, previous practice, the metadata attached to the dataset, and the like. A good filtering category resolves the dataset into separate subsets. In an embodiment, multiple filters are applied. Examples of criteria for filtering categories are described in the concurrently filed, commonly owned U.S. patent application, which was previously incorporated by reference: "Apparatus and Method for Categorical Filtering of Data", U.S. Pat. No. 7,493,330, filed Oct. 31, 2006. In one embodiment, the GUI module 116 displays subsets of the filtering categories. Each subset may be based on a criterion set by the data filtering module 114 (e.g. highest merit lowest merit, closest to a target value and the like) or a request from the user.

The next operation 202 of FIG. 2 is to filter the data. In one embodiment, this can be done by clicking on a data filter. The data filtering module 114 accepts this filter or a default filter and returns a data subset based on the given dataset and data filter, which is displayed by the GUI module 116.

The next operation 204 is to provide the filtered dataset and a further set of data filters. The data filtering module 114 retrieves the filtering categories for the data subset and all distinct attributes for each filtering category. The GUI module 116 displays this information to the user as a nested filter panel, maintaining the state of the parent data filter panel.

The computer 100 waits for the user, or another agent, to select a filter 206. If a filter is not selected (206—No), then the process stops until one is selected. If a filter is selected (206—Yes), then the data filtering module 114 filters the dataset based on the new filter as well as any previously specified filters. It is possible for the user to continue specifying further data filters until there are no longer any valid filtering categories for the data subset. With each additional filter, all previous filter panels are maintained, building a stack of nested panels.

The user may also alter previously specified filters at any time. In one embodiment they can do so by either clicking on the new filter within the filter panel of the filter to be changed, or typing the filter into the panel header of the filter panel following the filter panel of the filter to be changed.

Figure 3:
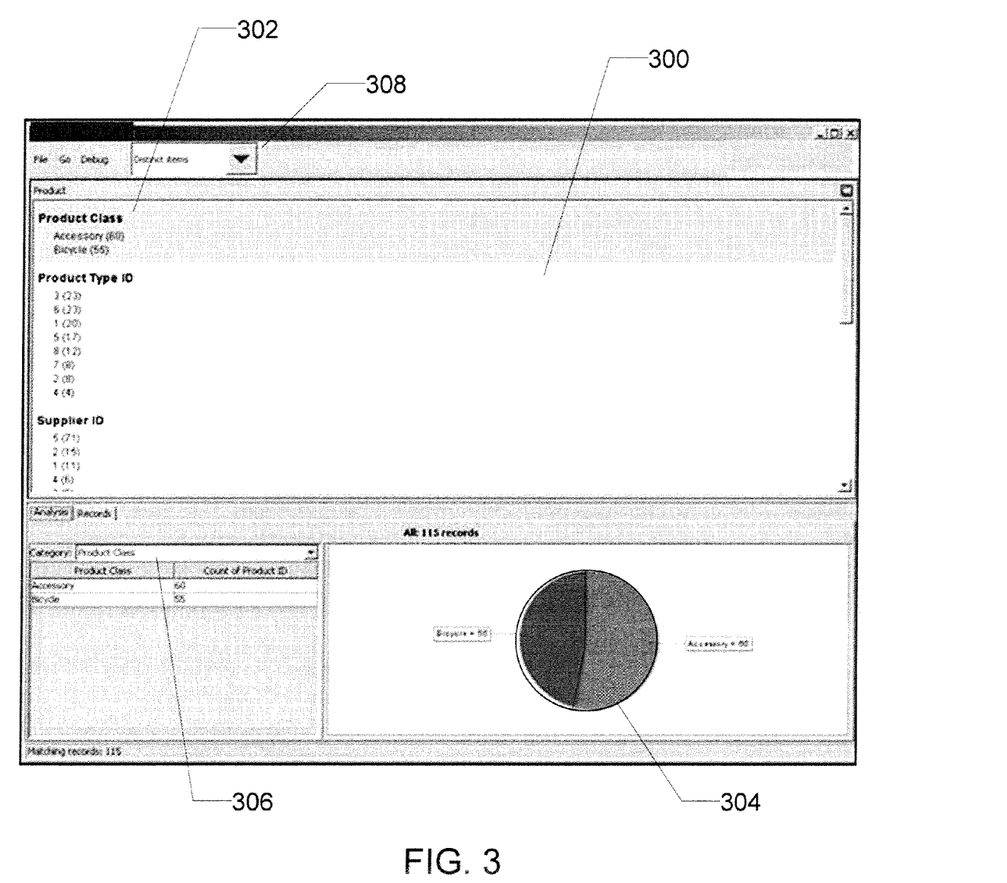
FIG. 3 illustrates a single filter panel and result chart view configured in accordance with an embodiment of the invention.

The GUI module 116 displays a screen with unfiltered or filtered data to the user. FIG. 3 illustrates the initial screen before any filters have been applied. The "Product" panel 300 is an example of a filter panel with no filter selected. The chart 304 displays the breakdown of the data, which is based on a combination of the selected category "Product Class" 302 and the data measure "Distinct Items" 308.

In an embodiment, different data breakdown categories can be selected either by clicking on the category within the filter panel 300 or by selecting the category from the drop-down list 306. Changing the selected category in either of these, updates the other. In an embodiment, multiple data breakdown categories can be selected simultaneously to display a multidimensional chart. Changing the data breakdown category automatically refreshes the result chart and the record list.

The data measure can be based on any available quantitative value. For example, data could be measured by sales, profit, quantity and the like. In an embodiment the user can select the data measure using the dropdown list 308. In an embodiment, the available measures are displayed in a panel superior to the head panel. In an embodiment, multiple measures can be selected simultaneously to display the correlation between them in the chart view. The result chart and record list are refreshed when a data measure is changed.

Figure 4:
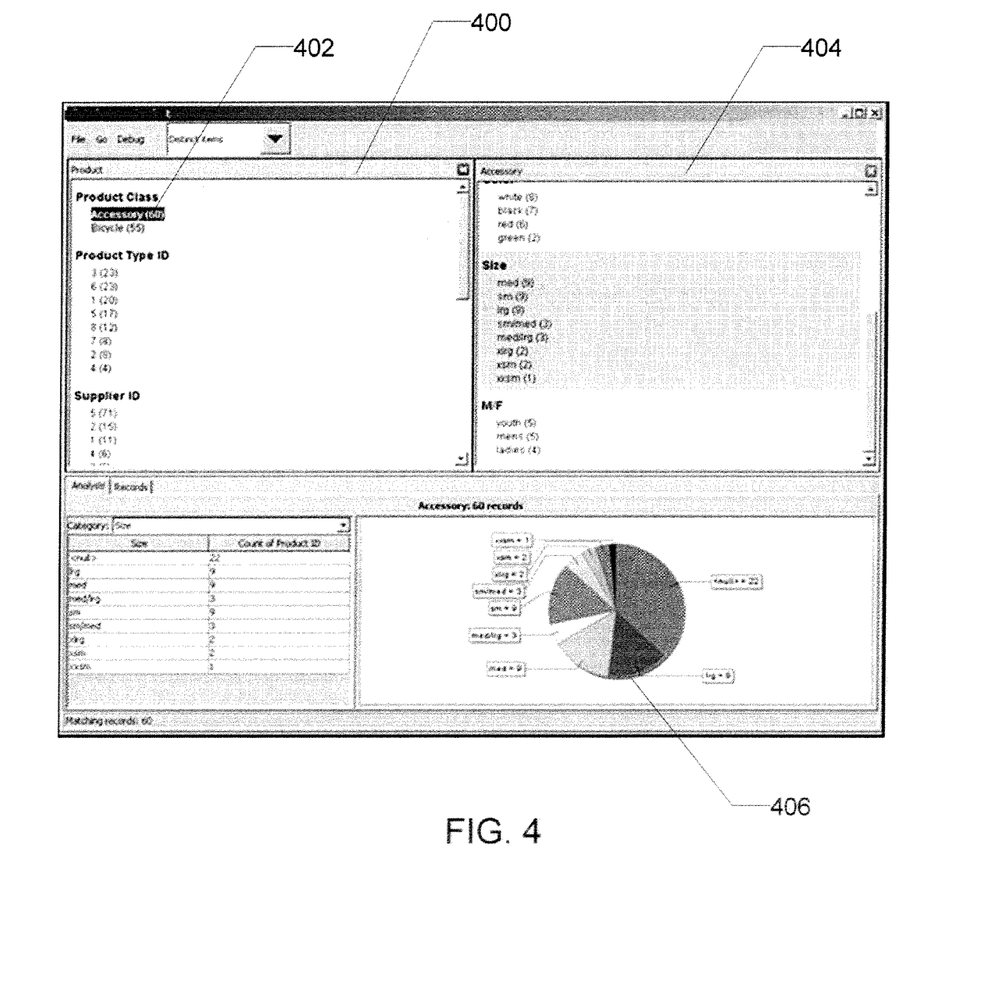
FIG. 4 illustrates a result chart view and the filter panel of FIG. 3 supplemented with a nested second filter panel in accordance with an embodiment of the invention.

FIG. 4 illustrates the result of specifying a filter. As shown in the filter panel 400, the data has been filtered on the "Product Class" category using the attribute "Accessory". In one embodiment, when a filter is selected it is highlighted as illustrated by the highlighting 402. The resulting data subset is displayed in the chart 406. The data breakdown is based on the selected category in the last of the filter panels (i.e., the filter panel with no nested child filter panels 404). In one embodiment, the selected category defaults to the top category listed in the last of the filter panels.

The nested filter panel 404 displays the new set of available filter categories. In this embodiment, nested panels are displayed to the right of their parent panel. Note that the initial filter panel 400 is still displayed.

FIG. 5 illustrates the records tab associated with the chart 406 of FIG. 4. In one embodiment, all fields of each record in the filtered subset are displayed in a list. By clicking on the "Records" tab 500 at anytime, the user can opt to view results in a record list format 502. Similarly, clicking the "Analysis" tab 504 returns the user to the chart view. In an embodiment, the user may view a record list and a chart view simultaneously.

Figure 6:
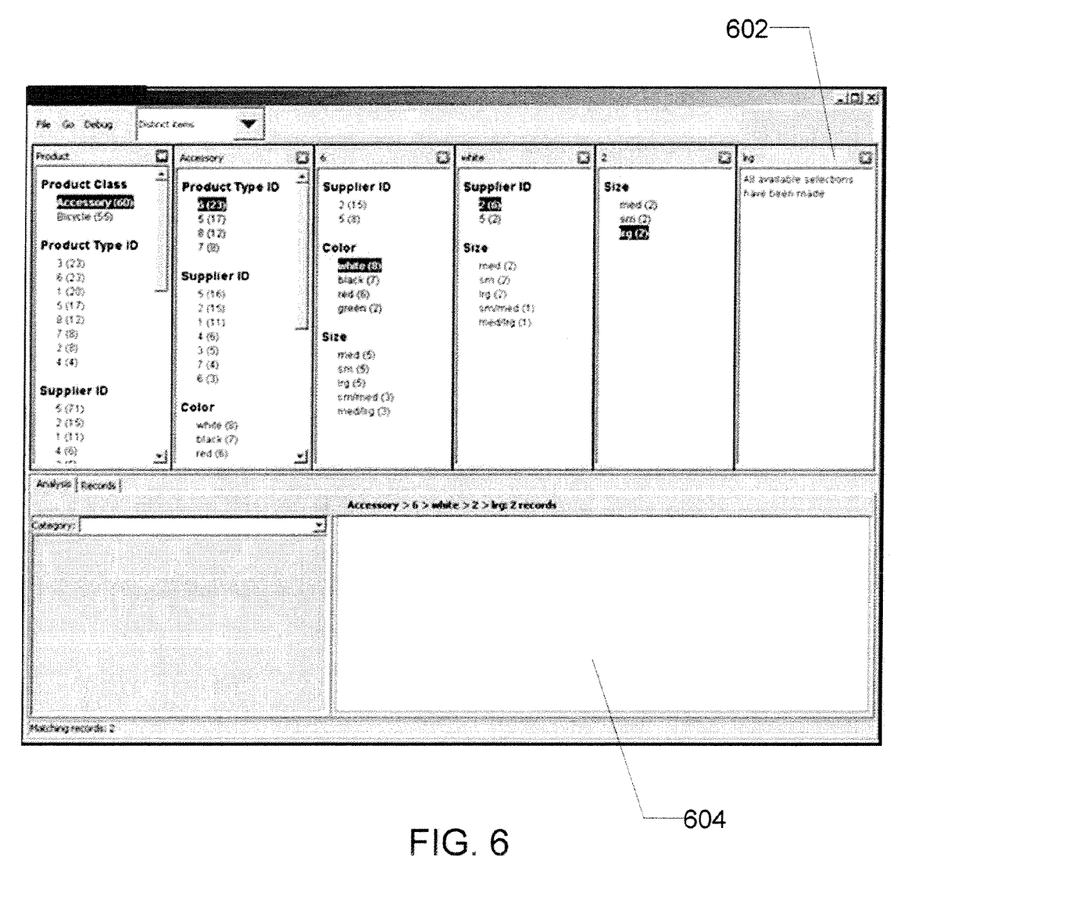
FIG. 6 illustrates the result of running out of applicable filtering categories in accordance with an embodiment of the invention.

FIG. 6 illustrates the result of selecting many filters. Each successive filter panel displays a different subset of filter categories, while the state of all previous filter panels is maintained. In this embodiment, once all available selections have been made the final filter panel 602 alerts the user. As there are no categories available in the last of the filter panels, no category can be selected for data breakdown. Consequently, no data chart is displayed as illustrated in panel 604; however, the records tab displays the resulting record list.

Figure 7:
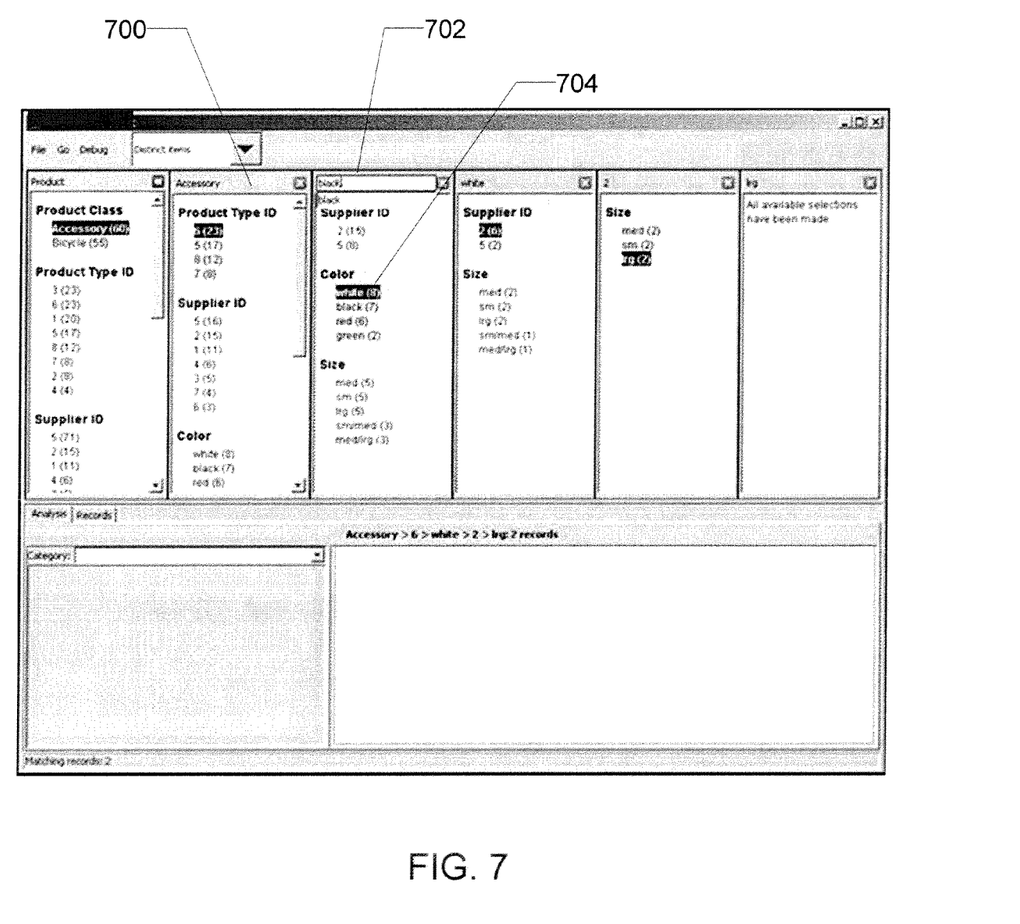
FIG. 7 illustrates changing a previously specified filter in accordance with an embodiment of the invention.

FIG. 7 illustrates a method for changing a previously specified filter. The filter of the filter panel 700 can be changed by typing a new filter into the panel header of filter panel 702. In one embodiment, all the subsequent nested filter panels are repopulated and the associated filters are reapplied. This presents three possible cases: all the nested filters are still applicable, a portion of the nested filters are still applicable, none of the nested filters are still applicable. If all the filters specified in the nested panels are applicable to the new data subset according to the underlying filter logic, they are maintained after making the change. If only a portion of the filters are still applicable, the first inapplicable filter and all subsequent nested filters are cleared. If none of the filters are applicable, they are all cleared. Note that the filter "white" 704 set in the filter panel 702 is in the "Color" category Therefore, when the filter of the parent filter panel 700 is changed to filter on the "Color" category, the filter "white" 704 will no longer apply as two filters from the same category cannot be applied simultaneously. Consequently, the filter panel 702 and all subsequent nested filter panels will be cleared.

Figure 8:
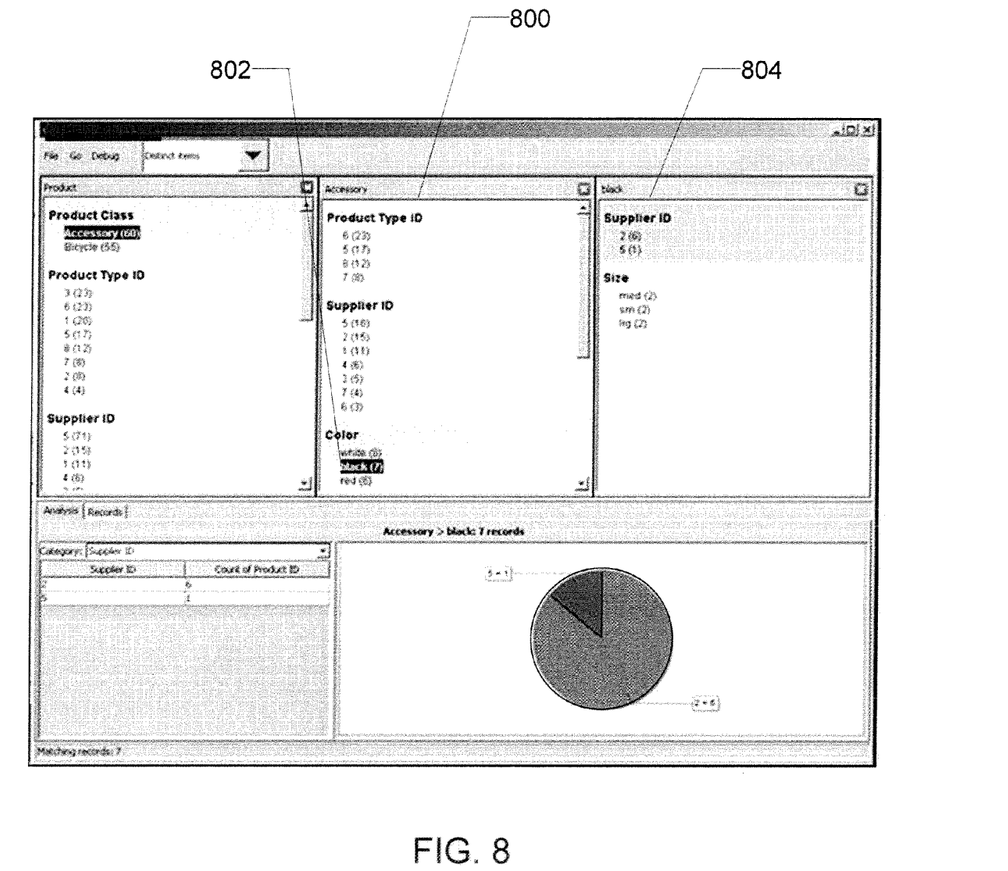
FIG. 8 illustrates the result of changing a previously specified filter as in FIG. 7 in accordance with an embodiment of the invention.

FIG. 8 illustrates the result of changing the filter of filter panel 800 to the filter "black" 802. The panel header of filter panel 804 reflects the new filter "black" as previously entered. Note that the previously specified nested filter panels have been cleared as indicated earlier.

Figure 9:
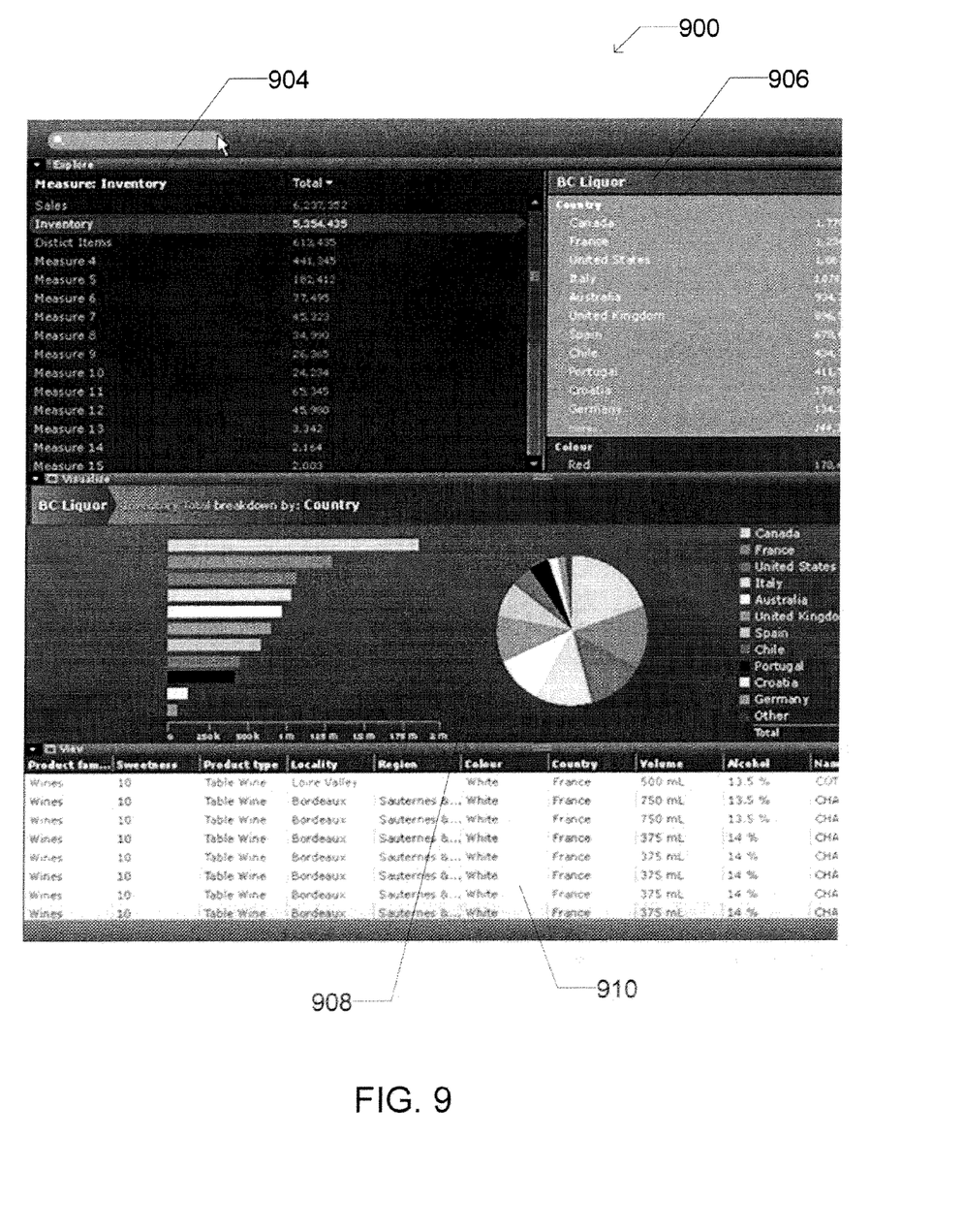
FIG. 9 illustrates an alternate embodiment of the invention.

FIG. 9 illustrates an alternate embodiment of the invention 900. In this embodiment, data measures are displayed and selected from a nested panel 904 superior to the head panel 906. Additionally, the chart view 908 and the result list 910 can be viewed simultaneously as illustrated or collapsed to display one or neither view.

Figure 10:
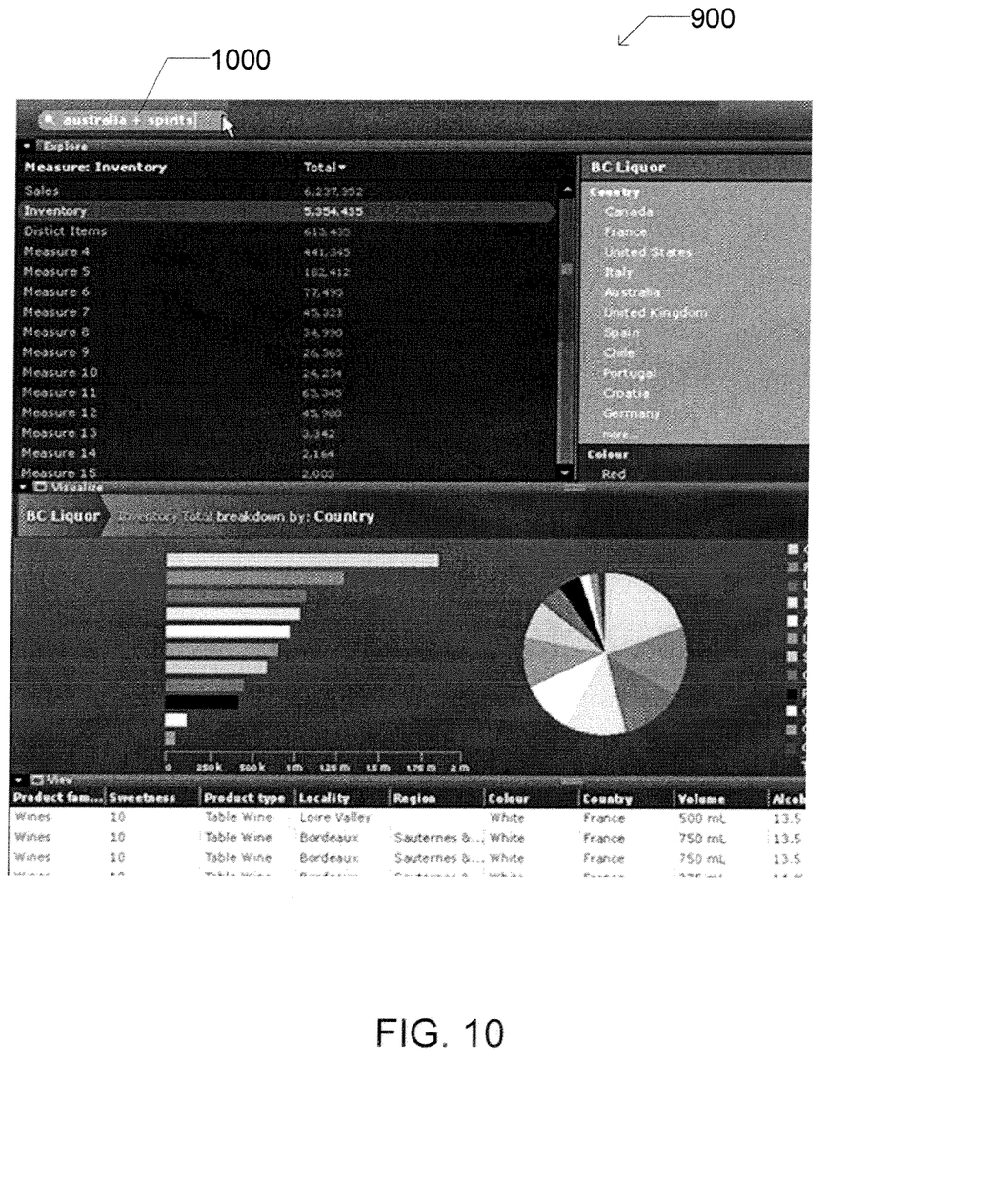
FIG. 10 illustrates specifying multiple levels of filters simultaneously in accordance with an embodiment of the invention.

FIG. 10 illustrates an embodiment of the invention 900 that allows the user to specify multiple levels of filters at once. In this embodiment, the user may specify multiple filters using the textbox 1000. As illustrated, the user has specified "Australia" and "spirits" as filters. Other embodiments include, but are not limited to, specifying multiple filters using checkboxes, a select list or from within a filter panel.

Figure 11:
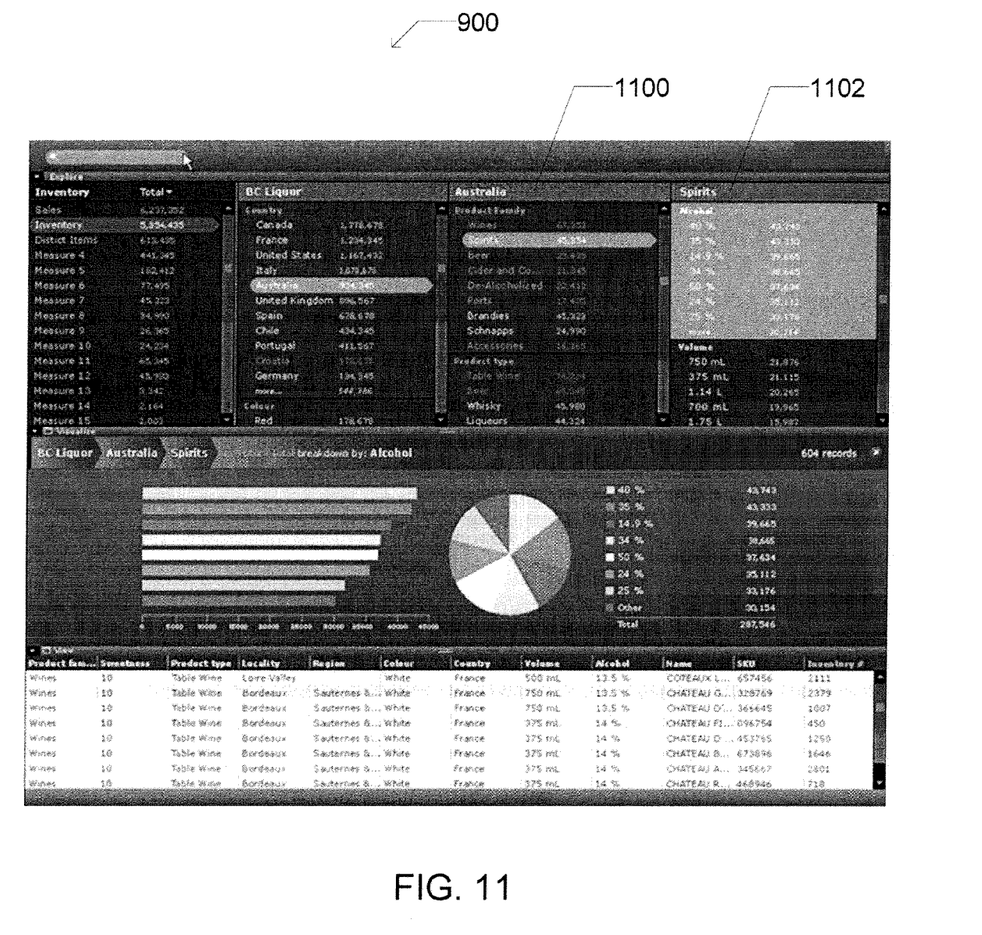
FIG. 11 illustrates the result of specifying multiple levels of filters simultaneously as in FIG. 10 in accordance with an embodiment of the invention.

FIG. 11 illustrates the results of specifying multiple levels of filters at once. The filters specified in FIG. 10 have been applied in the order that they were specified, creating two new nested filter panels, "Australia" 1100 and "Spirits" 1102.

Figure 12:
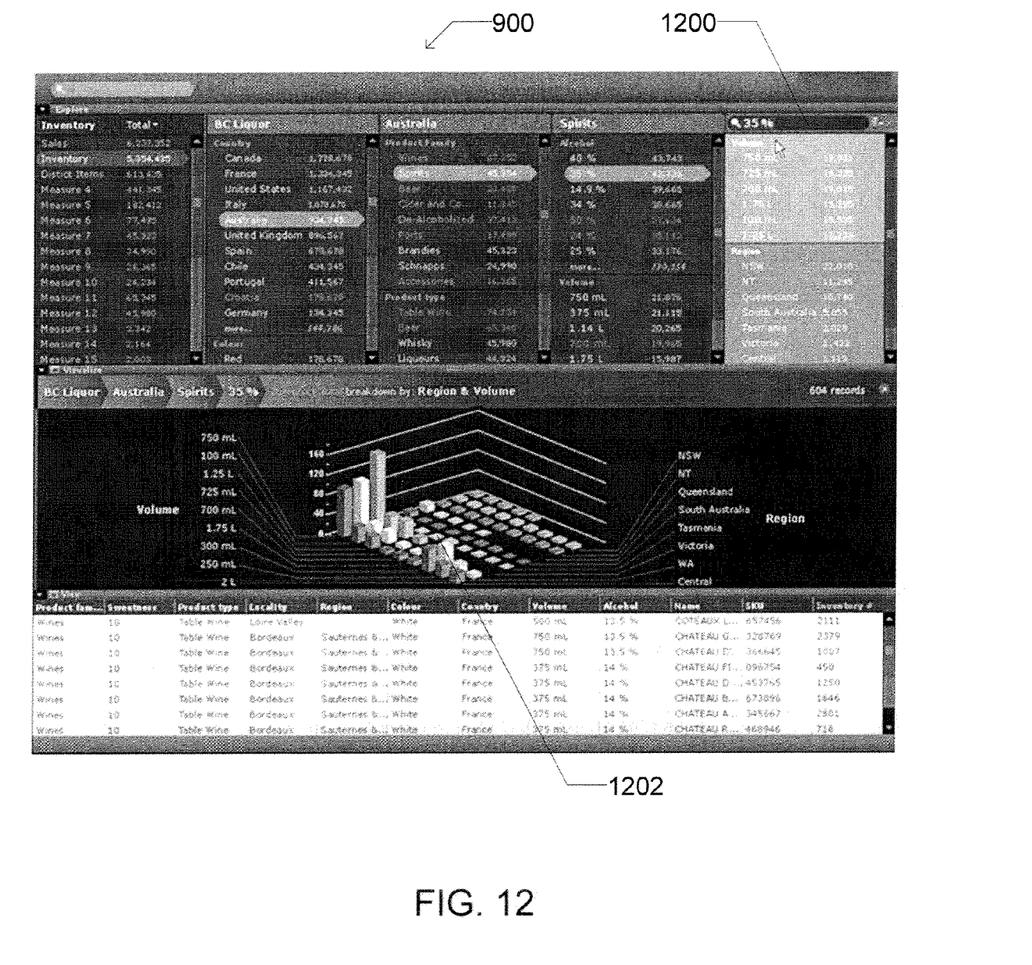
FIG. 12 illustrates selecting multiple data breakdown categories in accordance with an embodiment of the invention.

FIG. 12 illustrates an embodiment of the invention 900 in which the user can select multiple data breakdown categories in the last of the nested filter panels 1200. This refreshes the chart view to display a multidimensional chart 1202.

Figure 13:
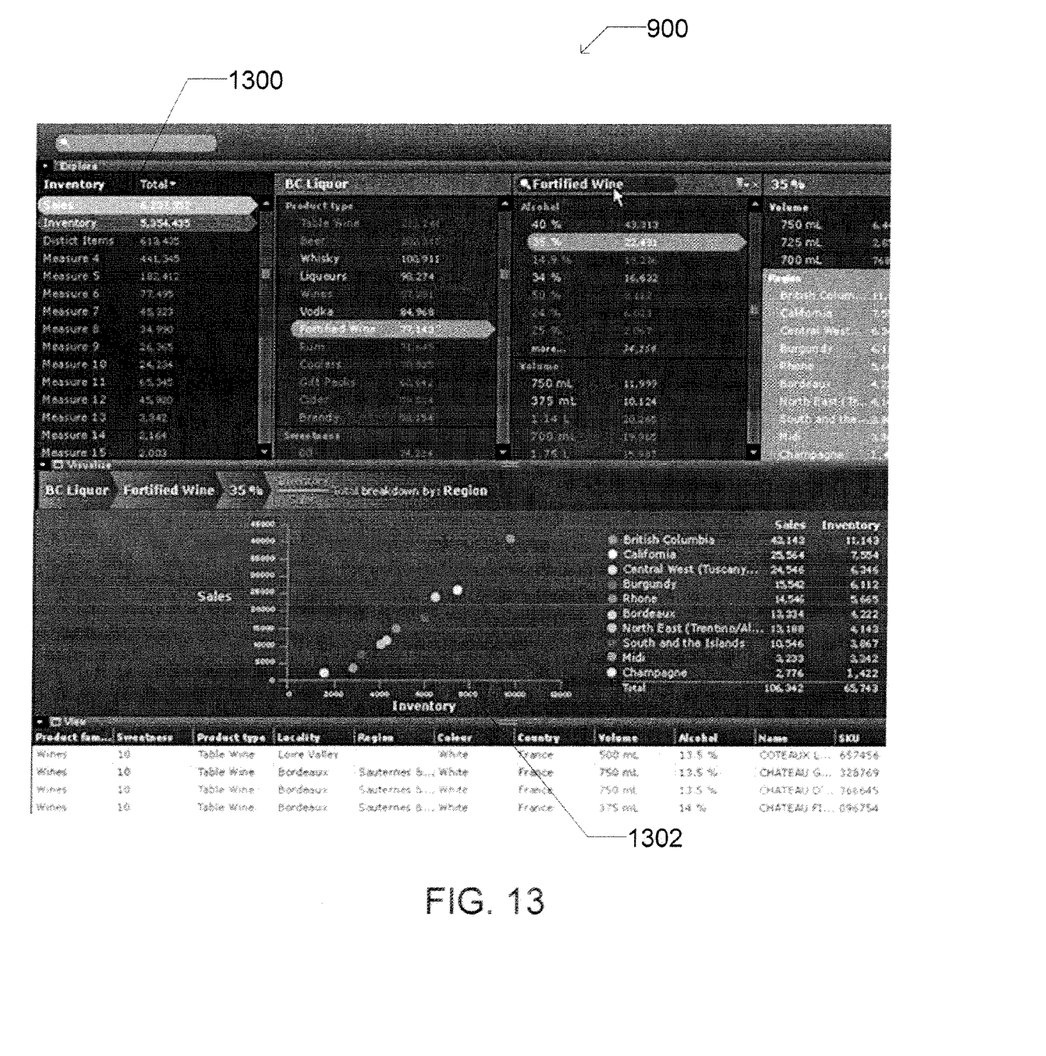
FIG. 13 illustrates selecting multiple measures in accordance with an embodiment of the invention.

FIG. 13 illustrates an embodiment of the invention 900 in which the user can select multiple measures from the measure panel 1300. This refreshes the chart view to display a chart 1302 depicting the correlation between the measures. In other embodiments, the user may select multiple measures using checkboxes, a select list or from within a filter panel.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
   receiving a data filter from a first panel of filtering categories displayed in a graphical user interface of a computer, wherein the filtering categories are displayed as a list;
   applying the data filter to a dataset to produce a data subset;
   displaying next to the first panel a second panel of filtering categories for the data subset, wherein the second panel of filtering categories are selected for the data subset and are displayed as a list; and
   repeating the applying and displaying such that each successive filter panel selects filtering categories for each new data subset and displays the filtering categories as a list, wherein all previous filter panels are displayed to establish an observable filter path.

2. The method of claim 1 wherein the first panel of filtering categories is selected from a head panel and a nested panel.

3. The method of claim 1 further comprising changing a data filter of a previous panel.

4. The method of claim 1 further comprising receiving a second data filter from the second panel and forming a third panel of filter categories next to the second panel.

5. The method of claim 1 further comprising selecting the data filter by clicking on a filter or typing the filter into a panel header.

6. The method of claim 1 further comprising displaying the data subset in a visualization selected from a chart and a graph.

7. The method of claim 1 further comprising receiving a plurality of data filters.

8. The method of claim 7 wherein the plurality of data filters is received from one of a textbox, a set of checkboxes, a select list and the first panel of filtering categories.

9. A computer readable storage medium, comprising executable instructions to:
   present a first panel of filtering categories displayed as a list in a graphical user interface of a computer;
   receive a selection of a first set of one or more data filters from the first panel;
   apply the first set of one or more data filters to a dataset to form a data subset;
   display next to the first panel a second set of one or more available data filters within a nested second panel of filtering categories, wherein the second set of one or more available data filters is selected based upon the data subset and is displayed as a list; and
   invoke the executable instructions to apply and display such that each successive filter panel displays as a list a different subset of filter categories relevant to each new data subset, while states of all previous filter panels are maintained to establish an observable filter path.

10. The computer readable storage medium of claim 9 wherein a representative data filter from the one or more available data filters is a filter selected from a first plurality of previously unapplied data filters and a second plurality of filters that resolves subsets within the dataset.

11. The computer readable storage medium of claim 9 further comprising executable instructions to display the data subset in a visualization selected from a chart and a graph.

12. The computer readable storage medium of claim 9 wherein the first panel of filtering categories is selected from a head panel and a nested panel.

13. The computer readable storage medium of claim 9 further comprising executable instructions to change the data filter of a superior panel.

14. The computer readable storage medium of claim 13 wherein the dataset is refreshed and all inferior nested panels are maintained.

15. The computer readable storage medium of claim 13 wherein the dataset is refreshed and an inferior nested panel containing a filter that is no longer applicable is removed.

16. The computer readable storage medium of claim 13 wherein the dataset is refreshed and an inferior nested panel containing a filter that is no longer applicable and a set of subsequent nested panels that stem from the inferior nested panel are removed.

17. A method of displaying a plurality of data filter panels within a window of a graphical user interface on a computer, the method comprising:
   displaying a first data filter panel including a first plurality of data filters displayed as a list;
   receiving a data filter from the first plurality of data filters;
   applying the data filter to a dataset to create a data subset;
   displaying a view of the data subset;
   displaying a second data filter panel, wherein:
      the second data filter panel is adjacent to the first data filter panel; and
      the second data filter panel includes a list of a second plurality of data filters that are available to filter the data subset; and
   repeating the applying and displaying such that each successive filter panel displays a different subset of filter categories relevant to each new data subset, while states of all previous filter panels are maintained to establish an observable filter path.

18. The method of claim 17 wherein the second plurality of data filters includes a second data filter selected from a previously unapplied data filter, a previously unselected data filter and a filter that resolves categories within the data subset.

19. The method of claim 17 wherein displaying a view of the data subset maintains a previously displayed third data filter panel.

20. The method of claim 17 further comprising:
   receiving a second data filter from the first plurality of data filters; and
   applying the second data filter to the dataset.

* * * * *